United States Patent
Xu et al.

(10) Patent No.: US 8,805,911 B1
(45) Date of Patent: Aug. 12, 2014

(54) CHOLESKY DECOMPOSITION IN AN INTEGRATED CIRCUIT DEVICE

(75) Inventors: Lei Xu, High Wycombe (GB); Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 593 days.

(21) Appl. No.: 13/149,661

(22) Filed: May 31, 2011

(51) Int. Cl.
*G06F 7/38* (2006.01)
(52) U.S. Cl.
USPC ............................................. 708/446
(58) Field of Classification Search
CPC ......... G06F 17/12; G06F 17/11; G06F 17/16; G06F 17/10; G06F 7/49989
USPC ............................................. 708/446
See application file for complete search history.

(56) References Cited

U.S. PATENT DOCUMENTS 3,794,984 A * 2/1974 Deerfield et al. ............... 712/11
5,323,335 A * 6/1994 Mitchell ....................... 708/320
2011/0238720 A1 9/2011 Langhammer et al.

OTHER PUBLICATIONS

Demirsoy, S. and Langhammer M., "Fused Datapath Floating Point Implementation of Cholesky Decomposition," High Wycombe: Altera, 2009.

* cited by examiner

*Primary Examiner* — Tan V. Mai
(74) *Attorney, Agent, or Firm* — Ropes & Gray LLP; Jeffrey H. Ingerman

(57) ABSTRACT

Efficient and scalable circuitry for performing Cholesky decomposition is based on two types of processing elements. A first type of processing element provides inverse square root and multiplication operations. A second type of processing element includes a first computation path for outputting an inner product difference element and a second computation path for outputting an inner product element. Processing elements of the first and second type may be cascaded to achieve a decomposition of a matrix of an arbitrary size. The circuitry is flexible to allow different throughput requirements, and can be optimized to reduce latency and resource consumption.

21 Claims, 6 Drawing Sheets

$$M = \begin{pmatrix} L_{1,1} & 0 & 0 & 0 & 0 \\ L_{2,1} & L_{2,2} & 0 & 0 & 0 \\ L_{3,1} & L_{3,2} & L_{3,3} & 0 & 0 \\ \cdot & \cdot & \cdot & \cdot & 0 \\ L_{n,1} & L_{n,2} & L_{n,3} & \cdot & L_{n,n} \end{pmatrix}$$

CHOLESKY DECOMPOSITION IN AN INTEGRATED CIRCUIT DEVICE

FIELD OF THE INVENTION

This invention relates to performing Cholesky decomposition in integrated circuit devices, and particularly in programmable integrated circuit devices such as programmable logic devices (PLDs).

BACKGROUND OF THE INVENTION

Certain matrix operations require that a matrix be factored. For example, factoring a matrix may be necessary when a matrix is to be inverted. The result may be a "triangulated" matrix—i.e., a matrix with zero values above the diagonal. The consequence is that only the values on the diagonal, and in the columns below those values, need to be calculated.

In Cholesky decomposition, to factor an input matrix A, an element $L_{i,i}$ of the diagonal of the resultant triangulated matrix M, may be calculated as:

$$L_{i,i} = \sqrt{\left(a_{i,i} - \sum_{k=1}^{i-1} L_{i,k} \cdot L_{i,k}\right)}$$

where $a_{i,i}$ is the i,i$^{th}$ element of the original input matrix A, and $L_{i,k}$ is the i,k$^{th}$ element in the resultant triangulated matrix M. The subsequent elements in the j$^{th}$ column of M may be calculated as:

$$L_{i,j} = \frac{1}{L_{j,j}}\left(a_{i,j} - \sum_{k=1}^{j-1} L_{i,k} \cdot L_{j,k}\right), \text{ for } i > j$$

where $a_{i,j}$ is the i,j$^{th}$ element of the original matrix input A, and $L_{i,k}$ and $L_{j,k}$ are the i,k$^{th}$ and j,k$^{th}$ elements, respectively, in the resultant triangulated matrix M. To perform this calculation, the $L_{j,j}$ term needs to be calculated before any of the $L_{i,j}$ (i>j) elements can be calculated. The inner product in each term (i.e., $\Sigma_{k=1}^{j-1} L_{i,k} \cdot L_{i,k}$ or $\Sigma_{k=1}^{j-1} L_{i,k} \cdot L_{j,k}$)—which, in the case of all real values is the same as a dot product, but in the case of complex values requires computing complex conjugates— may require dozens of clock cycles. Similarly, the square root calculation in the computation of $L_{i,j}$ can also impose noticeable latency.

Moreover, different Cholesky decomposition implementations may need to accommodate different matrix sizes or satisfy different throughput requirements. This may particularly be the case in programmable devices, where different users may require resources for matrix operations of different sizes or at different speeds.

SUMMARY OF THE INVENTION

The present invention relates to efficient and flexible circuitry for implementing Cholesky decomposition. A programmable integrated circuit device such as a programmable logic device (PLD) may be used to implement the Cholesky decomposition circuitry.

In accordance with embodiments of the present invention, there is provided circuitry for performing matrix decomposition operable to triangulate an input matrix to create a resultant triangulated matrix. The circuitry for performing matrix decomposition includes a plurality of processing elements of a first type for outputting respective elements of the resultant matrix. The circuitry for performing matrix decomposition also includes a plurality of processing elements of a second type, coupled to outputs of the plurality of processing elements of the first type, for outputting respective product elements corresponding to respective elements of said resultant matrix. Each one of the processing elements of the second type includes a first computation path and a second computation path. The first computation path is operable to add/subtract a product of respective first and second elements of the resultant matrix from a respective element of the input matrix to output a respective product difference element. The second computation path is configurable to combine respective third, fourth, fifth, and sixth elements of the resultant matrix to output a respective inner product element.

A method of configuring such circuitry on a programmable device, a programmable device so configurable, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figures 1, 2A:
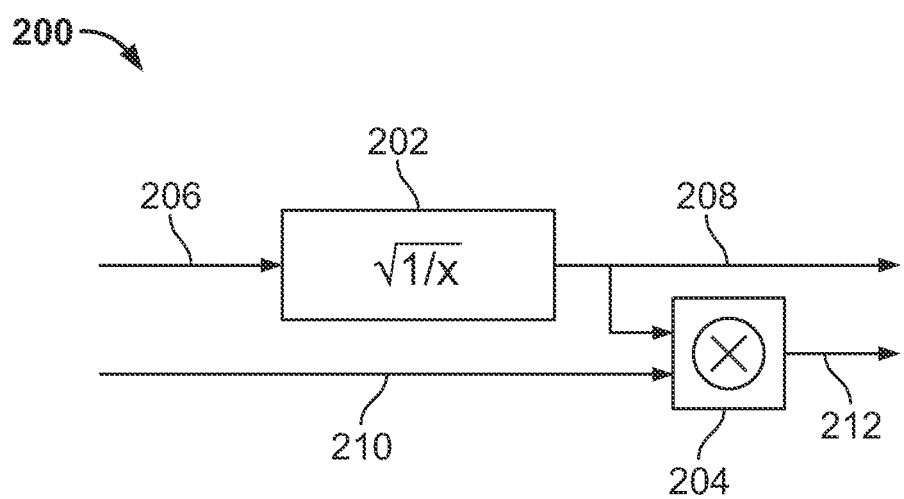
FIG. 1 shows an example resultant matrix of a Cholesky decomposition operation.
FIG. 2A shows a simplified block diagram of a processing element of a first type according to embodiments of the invention.

An example 100 of a triangulated n-by-n matrix M resulting from a Cholesky decomposition is shown in FIG. 1. The elements on the diagonal are $L_{1,1}, \ldots, L_{n,n}$. In each to column (e.g., column 106), the elements under $L_{j,j}$ are $L_{i,j}$, i=j+1, $\ldots$ , $L_{n,j}$. The matrix may be considered to be empty above the diagonal, or the elements above the diagonal may be considered to be zeroes, as illustrated in example 100. The elements on the diagonal are $L_{1,1}, \ldots, L_{n,n}$ and can be obtained using the following equation:

$$L_{i,i} = \sqrt{\left(a_{i,i} - \sum_{k=1}^{i-1} L_{i,k} \cdot L_{i,k}\right)}$$ (EQ. 1)

where $a_{i,i}$ is the i,i$^{th}$ element of the original input matrix A, and $L_{i,k}$ is the i,k$^{th}$ element in the resultant triangulated matrix M. The subsequent elements in the j$^{th}$ column of M may be calculated as:

$$L_{i,j} = \frac{1}{L_{j,j}}\left(a_{i,j} - \sum_{k=1}^{j-1} L_{i,k} \cdot L_{j,k}\right), \text{ for } i > j$$ (EQ. 2)

Figure 2B:
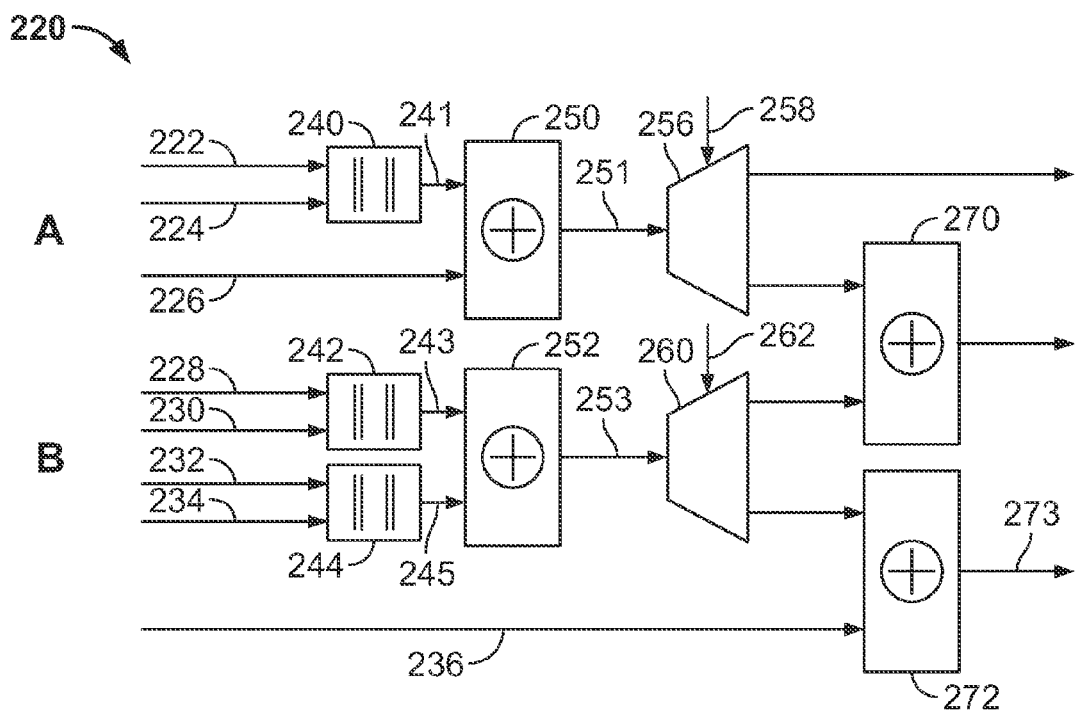
FIG. 2B shows a simplified block diagram of a processing element of a second type according to embodiments of the invention.
Figure 2C:
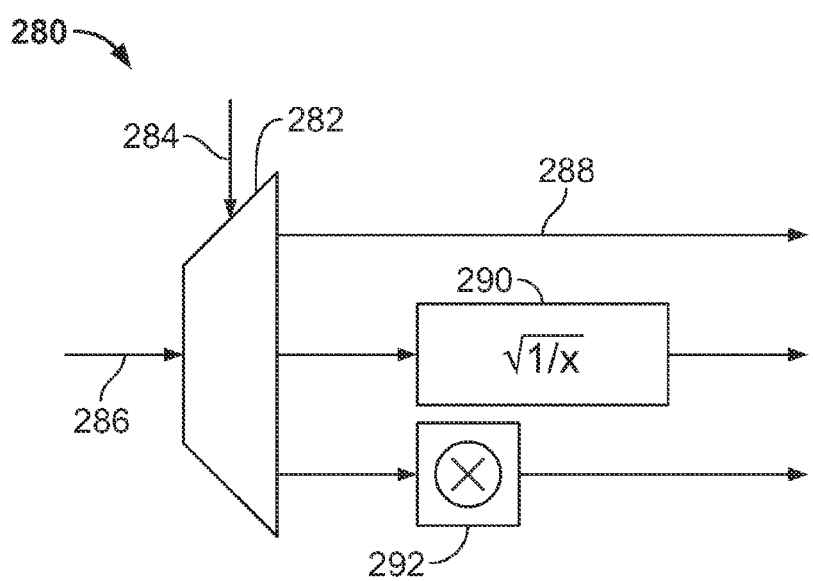
FIG. 2C shows a simplified block diagram of a preprocessing element according to embodiments of the invention.

Embodiments of the present invention are based on a recognition that the elements of each j$^{th}$ column of the resultant triangulated matrix M can be computed based on elements in the preceding 1$^{st}$ through (j−1)$^{th}$ columns of M. Two types of processing elements may be used to design efficient and flexible Cholesky decomposition circuitry that may be configured, for example, into a PLD. A configurable number of processing elements of each type may be cascaded for implementing a system that can perform matrix decomposition of a matrix of arbitrary size. In some configurations, elements of the first column of the resultant triangulated matrix M can be directly calculated using a processing element (PE) of a first type based on elements of the first column of the original matrix A. A processing element of this type will be referred to herein as a PE-I or Type I processing element, and is illustrated in FIG. 2A. Elements of the second through n$^{th}$ column of M can be calculated using a combination of processing elements of the first type PE-I cascaded with processing elements of a second type. A processing element of the second type will be referred to herein as a PE-II or Type II processing element and is illustrated in FIG. 2B. A third, optional type of processing element, or preprocessing element (PrePE), may be also be used and is illustrated in FIG. 2C below.

FIG. 2A shows a Type I processing element (PE-I) 200 having an inverse square root module 202 and multiplier circuitry 204. Inverse square root module 202 computes the inverse square root of input 206 generating the square root 208 of the input. Multiplier circuitry 204 multiplies the output of the inverse square root module 202 by input 210 to provide product element 212. The inverse square root is used instead of a direct square root calculation, because the inverse square root can be reused for the subsequent elements in the column using multiplication, which is easier and cheaper to implement than division. For example, the inverse square root 208, as output by module 202, may be reused by multiplier circuitry 204 or other multiplier circuitries in other processing elements, as will be discussed in greater detail below. Although one multiplier circuitry 204 is illustrated in FIG. 2A, it should be understood that the number of multipliers in PE-I is variable, so PE-I can have any number of multipliers as configured. The number of input and/or output ports of PE-I may change accordingly.

In some configurations of Type I processing elements, inputs 206 and 210 may correspond to elements of the input matrix A. For example, input 206 may correspond to element $a_{1,1}$ of the input matrix A and input 210 may correspond to element $a_{1,j}$ (j>1) of A. In this case, output 208 of inverse square root module 202 may correspond to element $L_{1,1}$ of M, and output 212 of multiplier circuitry 204 may correspond to element $L_{j,1}$ of M. Type I processing element (PE-I) 200 can thereby directly output elements $L_{1,1}, \ldots, L_{n,n}$ of the first column of the resultant triangulated matrix M.

In some configurations of Type I processing elements (PE-I), inputs 206 and 210 may correspond to intermediate elements in the calculation of the resultant triangulated matrix M, i.e., as shown in EQS. 1 and 2 above. In some configurations, these intermediate results may correspond to inner product elements. As used herein, the inner product elements correspond to elements $L_{i,k} \cdot L_{i,k}$ or $L_{j,k} \cdot L_{j,k}$, or sums of such elements corresponding to all or a portion of the inner product terms $\Sigma_{k=1}^{j-1} L_{i,k} \cdot L_{i,k}$ or $\Sigma_{k=1}^{j-1} L_{i,k} \cdot L_{j,k}$ of EQS. 1 and 2, respectively. In some configurations, these intermediate results may correspond to inner product difference elements, i.e., elements that are calculated by adding/subtracting inner product elements from elements of the input matrix A. These intermediate elements may be output by Type II processing elements (PE-II), as will be illustrated in greater detail in FIGS. 2B, 3, and 4 below.

As discussed above, Type II processing elements (PE-II) may be used in addition to Type I processing elements (PE-I). FIG. 2B illustrates a processing element 220 of the second type (PE-II). Processing element 220 may include two computation paths A and B. The outputs for these two computation paths A and B may be combined using adder circuitry 270. Computation path A may include norm computation element 240, adder circuitry 250, and selection circuitry 256. Computation path B may include norm computation elements 242 and 244, adder circuitries 252 and 272, and selection circuitry 260. Both or only one of computation paths A and B may be activated at any given period in any given processing element PE-II.

Inputs 222 and 224 of computation path A may be combined using norm computation element 240 to output a first inner product element 241. Norm computation element 240 may calculate the dot operation between inputs 222 and 224, which may be complex or real. Norm computation element 240 may be implemented using a complex multiplier or two real multipliers coupled to an adder. Norm computation element 240 may also support using one single complex input in order to output the product of the single complex input with its conjugate.

In some configurations, inputs 222 and 224 may correspond to different elements $L_{i,k}$ and $L_{j,k}$ (i≠j) in the k$^{th}$ column of the resultant triangulated matrix M. In this case, norm computation element 240 may output inner product element $L_{i,k} \cdot L_{j,k}$. This inner product element may be used to compute inner product term $\Sigma_{k=1}^{j-1} L_{i,k} \cdot L_{j,k}$ of EQ. 2 for computing element $L_{i,j}$ of the resultant triangulated matrix M.

In some configurations, inputs 222 and 224 may correspond to the same element $L_{1,k}$ of M. In this case, norm computation element 240 may output inner product element $L_{i,k} \cdot L_{i,k}$. This inner product element 241 may be used to compute inner product term $\Sigma_{k=1}^{j-1} L_{i,k} \cdot L_{i,k}$ of EQ. 1 for computing element $L_{i,i}$ of M.

In some configurations, adder circuitry 250 may be operable to combine inner product element 241 and input 226. Input 226 may correspond to element of the input matrix A. Adder circuitry 250 may add/subtract, from element the inner product element $L_{i,k} \cdot L_{j,k}$ provided by norm computation element 240. Adder circuitry 250 may thus compute an inner product difference element $a_{i,j} - L_{i,k} \cdot L_{j,k}$, which may be used to compute element $L_{i,j}$ of M, as specified in EQ. 2.

In some configurations, input 226 may correspond to element $a_{i,i}$ of the input matrix A. In this case, adder circuitry 250 may add/subtract, from element $a_{i,i}$, the inner product element $L_{i,k} \cdot L_{i,k}$ provided by norm computation element 240. Adder circuitry 250 thus outputs an inner product difference element $a_{i,j} - L_{i,k} \cdot L_{j,k}$, which may be used to compute element $L_{i,j}$ of M, as specified in EQ. 1.

Inner product difference element 251 at the output of adder circuitry 250 may be output directly, as an element $L_{i,j}$ or $L_{i,i}$ of M, and/or may be used in subsequent computations with adder circuitry 270. This may be achieved using selection circuitry 256, and can be controlled, e.g., by selection signal 258.

Computation path B may compute one or two norms using norm computation element 242 and/or norm computation element 244. Inputs 228 and 230 of computation path B may be combined using norm computation element 242 to output a first inner product element 243 and inputs 232 and 234 may be combined using norm computation element 244 to output a second inner product element 245. Norm computation element 242 may function similarly to norm computation element 240. For example, norm computation element 242 may output inner product element $L_{i,k} \cdot L_{j,k}$ corresponding to different elements of M (e.g., as in EQ. 2), or it may output inner product element $L_{i,k} \cdot L_{i,k}$ corresponding to same element of M (e.g., as in EQ. 1). Norm computation element 244 may operate similarly to norm computation element 240 and/or norm computation element 242.

Adder circuitry 252 may sum inner product elements 243 and 245 to provide inner product element 253, i.e., $L_{i,k} \cdot L_{j,k} + L_{i,(k+1)} \cdot L_{j,(k+1)}$. This inner product element 253 may correspond to all or a portion of the inner product term $\sum_{k=1}^{j-1} L_{i,k} \cdot L_{j,k}$ of EQ. 2 or $\sum_{k=1}^{j-1} L_{i,k} \cdot L_{i,k}$ of EQ. 1.

Selection circuitry 260 selectively provides inner product element 253 to adder circuitry 270 and/or adder circuitry 272. This may be controlled by control signal 262. In some configurations, for example, when both computation paths A and B are activated, selection circuitries 256 and 260 may provide inner product difference element 251 and/or inner product element 253, respectively, to adder circuitry 270.

In some configurations, adder circuitry 272 may be operable to add/subtract inner product element 253 to input 236. Like input 226, input 236 may correspond to an element of the input matrix A. Adder circuitry 272 may thus generate an inner product difference element 273. Adder circuitry 272 may operate similarly to adder circuitry 250.

The configuration of Type II processing element (or PE-II) 220 may be adapted based on implementation requirements, such as the size of the input matrix A and desired throughput. For example, only one, two, or 3 norm computation elements may be used during a given clock cycle, and only one or two computation paths may be activated. In some configurations, input 226 and/or input 236 may not be provided. All or only a subset of the components of PE-II 220 may be operable during any given clock cycle. This configurability increases flexibility and scalability of design, as will be described below.

In some embodiments, a third, optional type of processing element may be used. This element will be referred to herein as a preprocessing element (PrePE). PrePE 280 may be used to process previously computed elements for subsequent calculations. For example, PrePE 280 may be used instead of using a Type I processing element (PE-I). FIG. 2C illustrates an embodiment of a preprocessing element 280 which may include selection circuitry 282, inverse square root module 290, and multiplier circuitry 292. In some implementations, multiplier circuitry 292 may include a complex multiplier for calculating the norm value. In some implementations, multiplier circuitry 292 may have another input (not shown). This input may be used for loading a coefficient, e.g., to apply a weight value to the output from a previous output stage or to the final results. PrePE 280 may receive input 286, which may correspond to an already computed element of the resultant triangulate matrix M, or to an intermediate result such as an inner product element (e.g., output 212 of FIG. 2A or outputs 241, 243, or 245 of FIG. 2B) or an inner product difference element (e.g., output 251 or output 273 of FIG. 2B). Depending on the selection signal 284 of selection circuitry 282, PrePE 280 may directly output input 286 without any processing, or may output process input 286 using a processing block, such as inverse square root module 290 or multiplier circuitry 292.

Figure 3:
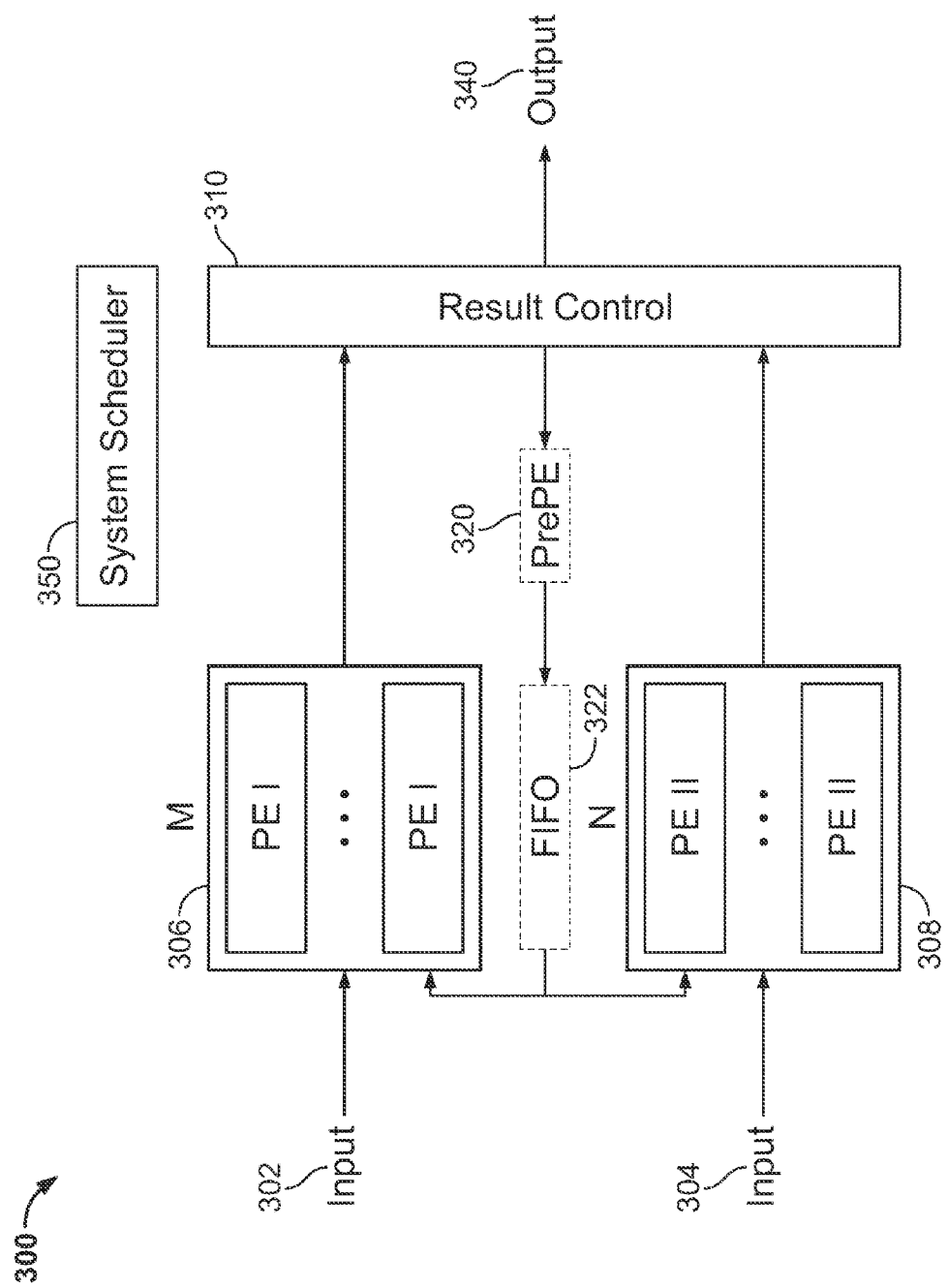
FIG. 3 shows a simplified block diagram of a system for performing Cholesky decomposition using processing elements according to embodiments of the invention.

By cascading a plurality of processing elements of Type I and II described in FIGS. 2A-C above, Cholesky decomposition circuitry may be implemented that can operate on an input matrix A of an arbitrary size and/or that can satisfy different throughput requirements. FIG. 3 shows a simplified block diagram of a system 300 for performing Cholesky decomposition according to embodiments of the present invention. System 300 includes a plurality 306 of M Type I processing elements PE-I, a plurality 308 of N Type II processing elements PE-II, a result control block 310, and a system scheduler 350. System 300 may also include a preprocessing element PrePE 320 and a First In, First Out (FIFO) buffer 322.

Inputs 302 and 304 may correspond to elements $a_{i,j}$ of the input matrix A. Each $a_{i,j}$ value is a single number (real or complex) that may be stored in a memory. In some embodiment, these $a_{i,j}$ values may be stored for fast access and can be addressed in a single clock cycle.

Each one or more clock cycles, e.g., as controlled by system scheduler 350, elements of the input matrix A may be input into processing elements 306 and 308. Each one of Type I processing elements 306 may compute inverse square roots and/or product elements as described in connection to FIG. 2A above. Each one of Type II processing elements 308 may compute inner product elements and/or inner product difference elements as described in connection with FIG. 2B above. Outputs of at least one of processing elements 306 and 308 may be provided to result control block 310. Result control block may determine which outputs of the at least one processing elements 306 and 308 to provide as elements of the resultant triangulated matrix M in output 340.

In some implementations, elements output by at least one of the processing elements 306 and 308 may be reused in subsequent computations of elements of the resultant triangulated matrix M. These elements output by processing elements 306 and 308 may themselves correspond to elements of M, or they may correspond to intermediate results in the computation of elements of M (e.g., inner product elements or inner product difference elements, as described above). Result control block 310 may determine which output elements of processing elements 306 and 308 to reuse and may provide these elements as inputs to the same one or other ones of processing elements 306 and 308.

In some implementations, result control block 310 may provide output elements of processing elements 306 and 308 as inputs to the same or other ones of processing elements 306 and 308 through PrePE 320 and/or preprocessing FIFO buffer 322. PrePE 320 may preprocess elements provided by result control block 310. This preprocessing may use any of the processing blocks described with respect to FIG. 2C, or any other appropriate processing blocks. In some implementations, FIFO buffer 322 may be used to store elements provided by result control block 310 that may subsequently be reused by at least one of processing elements 306 or 308.

Figure 4:
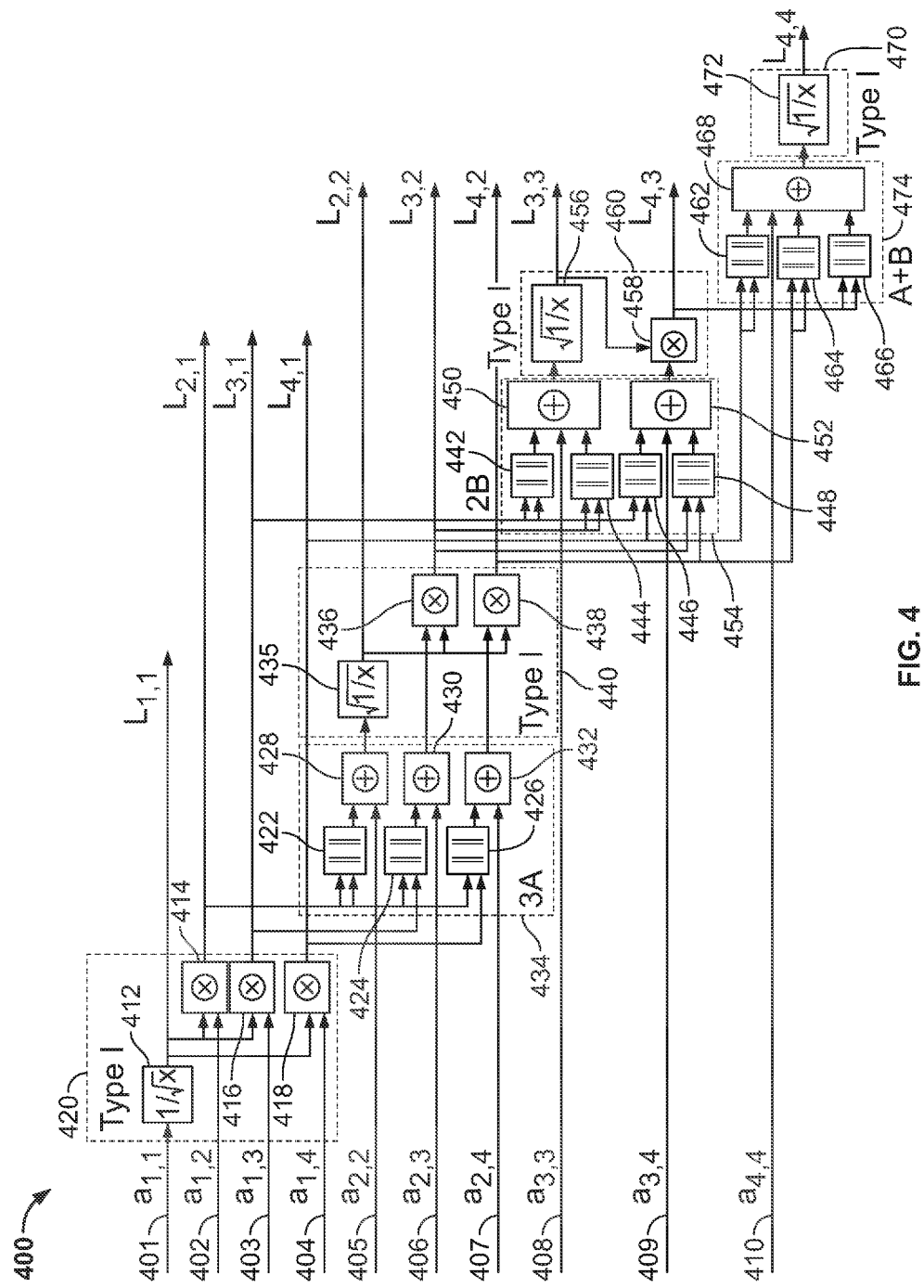
FIG. 4 shows one embodiment, according to embodiments of the invention, of a circuit arrangement used in the performance of Cholesky decomposition for 4-by-4 input matrix.

One illustrative implementation of system 300 for a 4-by-4 input matrix A is shown in FIG. 4. Illustrative system 400 of FIG. 4 processes inputs 401-410 corresponding to elements of the input matrix A to provide elements $L_{1,1}$ through $L_{4,4}$ of the resultant triangulated matrix M. For this Cholesky decomposition example, system 400 may include processing blocks 420, 440, 460, and 470, which may be implemented using Type I processing elements. These processing blocks will be referred to as Type I processing blocks. System 400 may also include processing blocks 434, 454, and 474, which may be implemented using Type II processing elements. These processing blocks will be referred to as Type II processing blocks. Type I and Type II processing blocks may be cascaded, such that each Type I processing block alternates with a Type II processing block. In the example shown in FIG. 4, a Type I processing block (e.g., block 420) may cascaded with a Type II processing block (e.g., block 434), which in turn may be cascaded with a Type I processing block (e.g., block 440), and so on.

Processing block 420 may process elements 401-404 of the first column of A to output corresponding elements of the first column of the resultant triangulated Cholesky matrix M. Processing block 420 may include inverse square root module 412 for calculating the inverse square root of matrix element $a_{1,1}$, and multiplier circuitries 414, 416, and 418 for multiplying the inverse square root by respective elements of A to output corresponding elements of M. For example, multiplier circuitry 414 may output $L_{2,1}=a_{2,1}/L_{1,1}$, multiplier circuitry 416 may output $L_{3,1}=a_{3,1}/L_{1,1}$, and multiplier circuitry 418 may output $L_{4,1}=a_{4,1}/L_{1,1}$. Processing block 420 may be implemented using one Type I processing element (PE-I) as shown in FIG. 2A. For example, $L_{1,1}$ through $L_{4,1}$ may be computed by processing block 420 every clock cycle using one Type I processing element (PE-I).

Processing blocks 434 and 440 may be used to calculate values of the second column of M. Processing block 434 may be coupled to the output of processing block 420. Processing block 434 may include normal computation elements 422, 424, and 426 and adder circuitries 428, 430, and 432. In some configurations, processing block 434 may be implemented using computation paths A of three Type II processing elements PE-II. Using the computation path A of the first PE-II, norm computation element 422 may compute inner product element $L_{2,1} \cdot L_{2,1}$, where $L_{2,1}$ is output by multiplier circuitry 414 of processing block 420. Adder circuitry 428 may compute the difference between matrix element $a_{2,2}$ and the inner product element $L_{2,1} \cdot L_{2,1}$ to output inner product difference element $a_{2,2}-L_{2,1} \cdot L_{2,1}$. Similarly, norm computation element 424 and adder circuitry 430 may output inner product difference element $a_{3,2}-L_{3,1} \cdot L_{2,1}$ using the computation path A of the second PE-II. Norm computation element 426 and adder circuitry 432 may output inner product difference element $a_{4,2}-L_{4,1} \cdot L_{3,1}$ in the computation path A of the third PE-II.

The outputs of processing block 434 may be processed using processing block 440 to generate elements of the second column of M. Processing block 440 may include inverse square root module 435 for calculating the inverse square root of the inner product difference element $a_{2,2}-L_{2,1} \cdot L_{2,1}$, which corresponds to, and may be output as, $L_{2,2}$. Processing block 440 may also include multiplier circuitries 436 and 438 for multiplying the inverse square root by respective inner product difference elements $a_{3,2}-L_{3,1} \cdot L_{2,1}$ and $a_{4,2}-L_{4,1} \cdot L_{3,1}$ to output $L_{3,2}$ and $L_{4,2}$, respectively. Like processing block 420, processing block 440 may be implemented using one Type I processing element.

Processing blocks 454 and 460 may be used to calculate values of the third column of M. Processing block 454 may be coupled to outputs of processing blocks 420 and 440 and may include normal computation elements 442, 444, 446, and 448 and adder circuitries 450 and 452. In some configurations, processing block 454 may be implemented using computation paths B of two Type II processing elements. In the first computation path B, norm computation element 442 may compute inner product element $L_{3,1} \cdot L_{3,1}$, where $L_{3,1}$ is output by multiplier circuitry 416 of processing block 420. Norm computation element 444 may compute inner product element $L_{3,2} \cdot L_{3,2}$, where $L_{3,2}$ may be output by multiplier circuitry 436 of processing block 440. Adder circuitry 450 may combine matrix element $a_{3,3}$ and inner product elements $L_{3,1} \cdot L_{3,1}$ and $L_{3,2} \cdot L_{3,2}$ to output inner product difference element $a_{3,3}-(L_{3,1} \cdot L_{3,1}+L_{3,2} \cdot L_{3,2})$. For example, adder circuitry 450 may be implemented using adder circuitries 252 and 272 and selection circuitry 260 of PE-II 220 of FIG. 2B, where norm computation element 442 corresponds to norm computation element 242, norm computation element 444 corresponds to norm computation element 244, and input 408 corresponds to input 236. Similarly, norm computation elements 446 and 448 and adder circuitry 452 may combine outputs of processing blocks 420 and 440 to output inner product difference element $a_{4,3}-(L_{4,1} \cdot L_{3,1}+L_{4,2} \cdot L_{3,2})$.

The outputs of processing block 454 may be processed using processing block 460 to generate elements of the third column of M. Processing block 460 may include inverse square root module 456 for calculating the inverse square root of the inner product difference element $a_{3,3}-(L_{3,1} \cdot L_{3,1}+L_{3,2} \cdot L_{3,2})$, which corresponds to, and may be output as, $L_{3,3}$. Processing block 460 may also include multiplier circuitry 458 for multiplying the inverse square root by inner product difference element $a_{4,3}-(L_{4,1} \cdot L_{3,1}+L_{4,2} \cdot L_{3,2})$ to output $L_{4,3}$. Like processing blocks 420 or 440, processing block 460 may be implemented using one Type I processing element.

Processing blocks 474 and 470 may be used to calculate values of the fourth column of M, e.g., element $L_{4,4}$. Processing block 474 may be coupled to outputs of processing blocks 420, 440, and 460 and may include normal computation elements 462, 464, and 466 and adder circuitry 468. In some configurations, processing block 474 may be implemented using computation paths A and B of one Type II processing element. In some configurations, processing block 454 may be implemented using computation path A of a first Type II processing element and computation path B of a second Type II processing element. In the computation path A, norm computation element 462 may compute inner product element $L_{4,1} \cdot L_{4,1}$, where $L_{4,1}$ is output by multiplier circuitry 418 of processing block 420. This inner product element may be combined with input 410, e.g., $a_{4,4}$. In the computation path B, norm computation element 464 and 466 may compute inner product element $L_{4,2} \cdot L_{4,2}+L_{4,3} \cdot L_{4,3}$). Adder circuitry 468 may combine outputs of computation paths A and B of processing block 474 to provide inner product difference element $a_{4,4}-(L_{4,1} \cdot L_{4,1}+L_{4,2} \cdot L_{4,2}+L_{4,3} \cdot L_{4,3})$. In some embodiments, adder circuitry 468 may be implemented using adder circuitries 250, 252, 270, and 272, and selection circuitries 256 and 260 of one Type II processing element.

The output of processing block 474 may be processed using processing block 470 to generate elements of the fourth column of M. Processing block 470 may include inverse square root module 472 for calculating the inverse square root of the inner product difference element $a_{4,4}-(L_{4,1} \cdot L_{4,1}+L_{4,2} \cdot L_{4,2}+L_{4,3} \cdot L_{4,3})$, which corresponds to, and may be output as, $L_{4,4}$. In some embodiments, processing block 470 may be implemented using a Type I processing element. In some embodiments, processing block 470 may be implemented using a preprocessing element (PrePE) such as the one illustrated in FIG. 2C.

In the Cholesky decomposition example of FIG. 4, the decomposition of the 4-by-4 input matrix A may be achieved using 4 Type I processing blocks, i.e., that could each be implemented with Type I processing elements (e.g., processing block 420, 449, 460 and 470), a Type II processing block with three computation paths A (block 434), a Type II processing block with two computation paths B (processing block 454), and a Type II processing block with one computation path A and one computation path B (processing block 474), for a total of four computation paths A and three computation paths B. Depending on throughput requirements, this may be achieved using four or less Type II processing elements.

The following table illustrates the number of Type I processing elements (PE-I) and of Type II processing elements (PE-II) that can be used to achieve different throughput requirements. For example, to perform Cholesky decomposition of one 4-by-4 matrix A every clock cycle, system 400 may be implemented using four Type I processing elements each performing the function of a respective one of processing blocks 420, 440, 460, and 470, and four Type II processing elements, three of which may be configured to use both their computation paths A and B, and the remaining one may be configured to only use its computation path A.

For a lower throughput requirement, hardware resources may be reused which may result in a reduced number of processing elements. For example, two Type I processing elements and two Type II processing elements may be used to achieve a throughput of one Cholesky decomposition per two or three clock cycles. In this implementation, a PE-I may perform the function of processing block 420 during a first clock cycle, and the function of processing block 460 during a second clock cycle. Similarly, only one Type I processing element and only one Type II processing element may be used for achieving one Cholesky decomposition of the 4-by-by matrix A every four clock cycles. In this implementation, one PE-I may perform the function of processing blocks 420, 440, 460, and 470 during respective subsequent clock cycles, while one PE-II may perform the function of processing blocks 434, 454, and 474 during respective subsequent clock cycles.

TABLE 1

Processing Elements per Throughput

| Throughput | Number of PE-I | Number of PE-II |
|---|---|---|
| (4 × 4 matrix)/1 cycle | 4 | 4 |
| (4 × 4 matrix)/2 cycle | 2 | 2 |
| (4 × 4 matrix)/3 cycle | 2 | 2 |
| (4 × 4 matrix)/4 cycle | 1 | 1 |

The above example illustrates that the number of type A and type B computation paths may be balanced for a larger number of Cholesky element computations, so that the hardware usage of Type II processing elements may be optimal or nearly optimal. For example, one could implement each processing block 434, 454, and 474 using separate Type II processing elements, e.g., using three Type II processing elements with their respective type A computation paths activated and their respective type B computation paths deactivated for processing block 434, two Type II processing elements for processing block 454, and one Type II processing element for processing block 474 for a total of six Type II processing elements. However, the number of type A and type B computation paths may be balanced such that the same Type II processing elements may be used in the implementation of different Type II processing blocks 434, 454, and/or 474. As illustrated above, one may determine the total number of computation paths required by all processing blocks 434, 454, and 474 of FIG. 4 (i.e., 3A+2B+(A+B)=4A+3B). Accordingly, a design with four type A computation paths and three type B computation paths may be used, for example, using only four Type II processing elements, or fewer elements, depending on throughput requirements as described above.

The architecture described above may be adapted to perform matrix operations on a matrix of an arbitrary size. For example, the number of cascaded processing elements of each type may be tailored to achieve the decomposition of any matrix size for different throughput requirements. According to one design approach, one would compute the number of Type I and Type II processing elements required for different throughput requirements, and then efficiently scale the system. For example, the number of PE elements of each type may be determined to meet a maximum throughput requirement. These determined numbers of processing elements of each type may then be divided by an arbitrary number of cycles for each matrix decomposition. In the example of Table 1 above, the number of PE-I and the number of PE-II may first be determined for a maximum throughput of one decomposition of the 4×4 matrix per cycle (i.e., the first row of Table 1). In some embodiments, these numbers of PE-I and PE-II may be computed based on counting the number of different processing elements in a Cholesky decomposition circuit arrangement such as the one illustrated in FIG. 4. In some embodiments, these numbers of PE-I and PE-II may be calculated based on the number of norm operations required for the overall matrix decomposition. For example, the number of PE-II may be determined by dividing the number of norm computations by three and adding one. The number of PE-I may be equal to the matrix size. From these determined numbers of PE-I and PE-II for the maximum throughput requirement, the number of PE-I and PE-II required for other throughput requirements may be derived. For example, the number of PE-I and PE-II may be determined in rows 2, 3, and 4 of Table 1 above from dividing the number of processing elements in row 1 to achieve a different throughput requirement.

The architecture described above may improve efficiency and reduce latency by decreasing resource consumption and reusing hardware and intermediate results. For example, higher peak systolic frequency may be achieved for systolic array architectures. This may be achieved by reusing PE-I and PE-II to compute different components at different stages, and/or by using preprocessing elements (PrePE), as described above.

The systems and methods discussed above may be used in floating point implementations to develop high performance data paths for matrix decomposition operations. Such a floating point-based approach may achieve better dynamic range compared to fixed-point implementations.

Although described above in the context of Cholesky decomposition, the systems and methods described herein may be implemented in other embodiments for a variety of matrix operations. For example, the systems and methods described herein may be used for solving linear matrices in an integrated circuit device, or any class of matrix operations involving multiplication of a series of vectors by a single initial vector. Therefore, in some of those embodiments, some of the structures included with the embodiments described above, such as adder circuitries 250, 270, 252, 272, or square root processing blocks 202, 290, may not be included, but those embodiments would still be within the present disclosure.

The structures described above also may be generated in fixed logic, in which case the sizes of the various computational components may be fixed to a particular application. Alternatively, the fixed logic circuitry could allow for limited parameterization.

One potential use for the systems and methods discussed above may be in programmable integrated circuit devices such as programmable logic devices, where programming software can be provided to allow users to configure a programmable device to perform matrix operations. The result would be that fewer logic resources of the programmable device would be consumed than otherwise. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to embodiments of the present invention for programming a programmable device to perform sample rate conversion may be encoded on a machine-readable medium, to be executed by a suitable computer or similar device to implement the method of embodiments of the present invention for programming or configuring programmable logic devices (PLDs) or other programmable devices. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 5A:
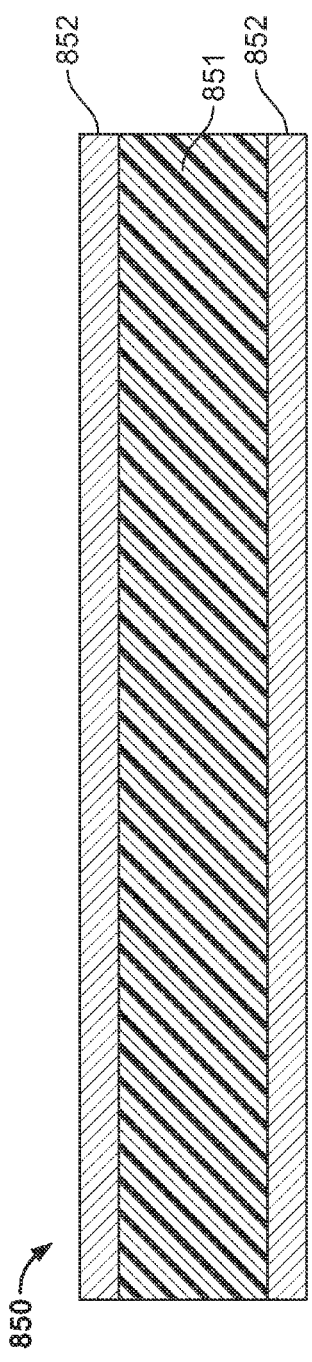
FIG. 5A is a cross-sectional view of a magnetic data storage medium encoded with a set of machine-executable instructions for performing the method according to embodiments of the present invention.

FIG. 5A presents a cross section of a magnetic data storage medium 850 which can be encoded with a machine executable program that can be carried out by systems such as the aforementioned personal computer, or other computer or similar device. Medium 850 can be a floppy diskette or hard disk, or magnetic tape, having a suitable substrate 851, which may be conventional, and a suitable coating 852, which may be conventional, on one or both sides, containing magnetic domains (not visible) whose polarity or orientation can be altered magnetically. Except in the case where it is magnetic tape, medium 850 may also have an opening (not shown) for receiving the spindle of a disk drive or other data storage device.

The magnetic domains of coating 852 of medium 850 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with embodiments of the present invention.

Figure 5B:
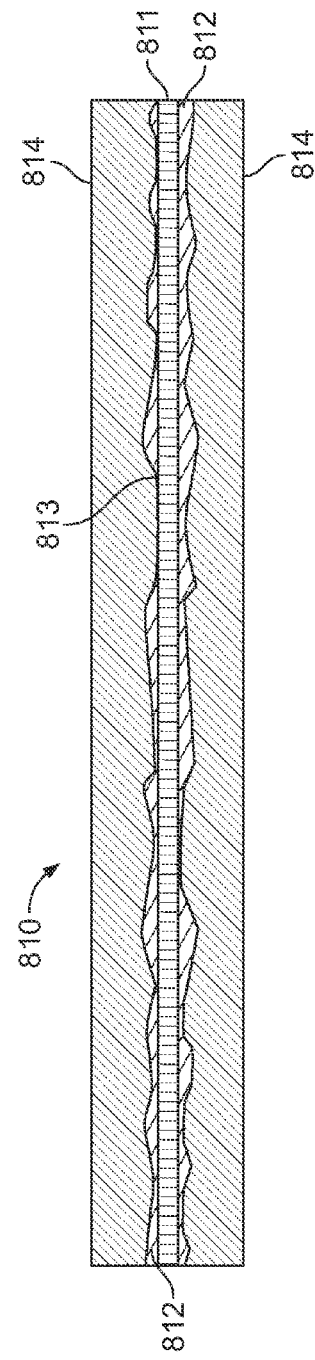
FIG. 5B is a cross-sectional view of an optically readable data storage medium encoded with a set of machine executable instructions for performing the method according to embodiments of the present invention.

FIG. 5B shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 6:
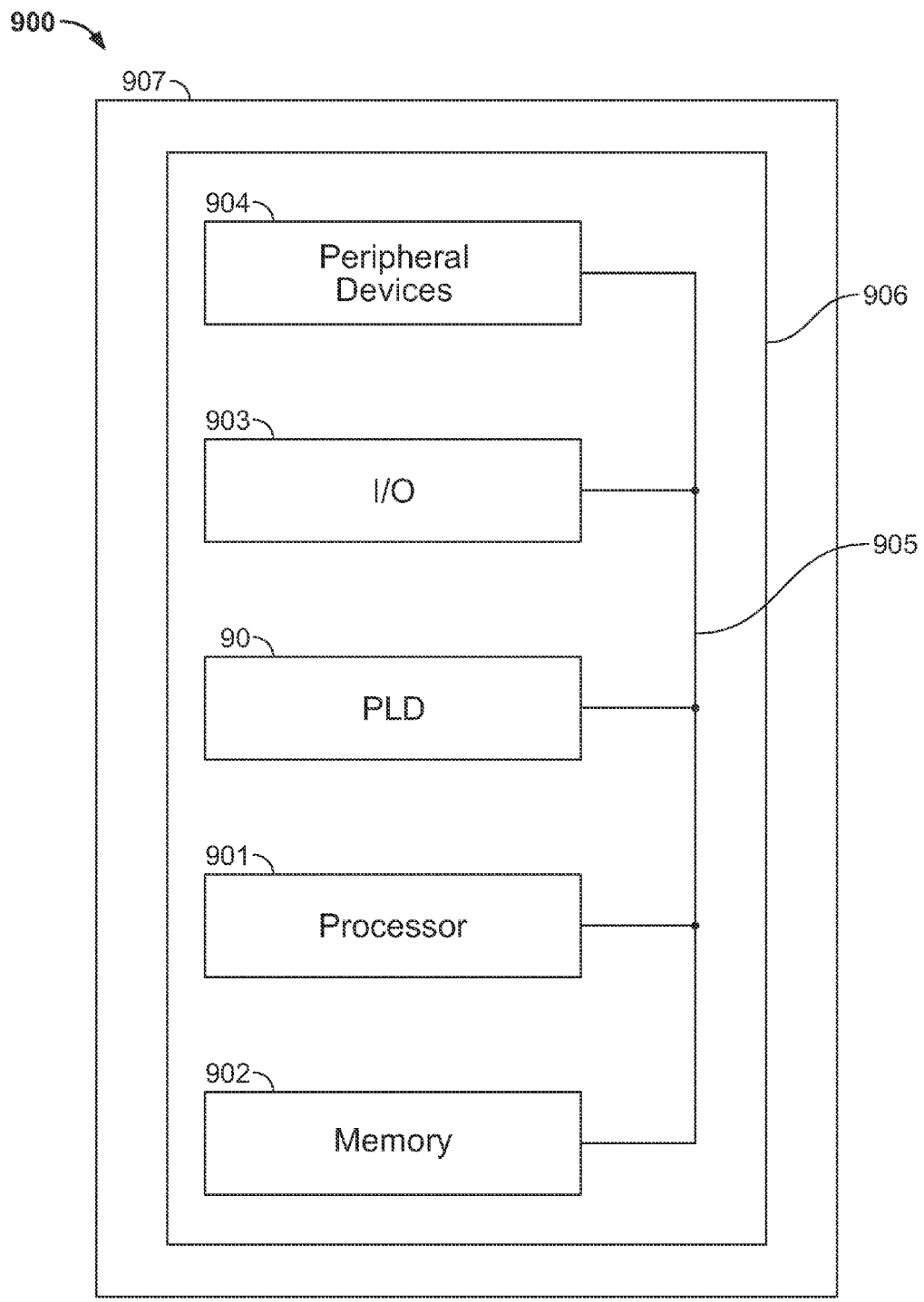
FIG. 6 is a simplified block diagram of an illustrative system employing a programmable logic device incorporating the embodiments of the present invention.

A PLD 90 programmed according to embodiments of the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating the embodiments of the present invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for decomposing an input matrix, the circuitry comprising:
   a plurality of processing elements of a first type for outputting respective elements of a triangulated resultant matrix; and
   a plurality of processing elements of a second type respectively coupled to outputs of the plurality of processing elements of the first type, for outputting respective inner product elements corresponding to respective elements of said resultant matrix, wherein each of the inner product elements is a single number.

2. The circuitry for decomposing the input matrix of claim 1, wherein each processing element of the plurality of processing elements of the second type comprises a first computation path and a second computation path, wherein:
the first computation path is operable to add or subtract a product of respective elements of the resultant matrix from a respective element of the input matrix to output a respective product difference element, and
the second computation path is operable to combine respective elements of the resultant matrix to output a respective inner product element.

3. The circuitry for decomposing said input matrix of claim 2, wherein each one of the first and second computation paths of each one of the processing elements of the second type is selectively activated during a particular clock cycle.

4. The circuitry for decomposing said input matrix of claim 2, wherein the first computation path of each one of the processing elements of the second type comprises:
a first norm computation element operable to combine two elements of the resultant matrix;
a first adder circuit operable to combine an output of the first norm computation element with an element of the input matrix; and
first selection circuitry operable to selectively output an output of the first adder circuit to a second adder circuit.

5. The circuitry for decomposing said input matrix of claim 4 herein the second computation path further comprises:
a second norm computation element for combining two elements of the resultant matrix other than the two elements associated with the first norm computation element;
a third norm computation element for combining two elements of the resultant matrix other than the two elements associated with the first and the second norm computation elements;
a third adder circuit for combining an output of the first and second norm computation elements; and
second selection circuitry for selectively outputting an output of the third adder circuit to the second adder circuit or to a fourth adder circuit.

6. The circuitry for decomposing said input matrix of claim 2 further comprising result control circuitry for receiving an output of the first and second plurality of processing elements and generating an output coupled to inputs of the first and second plurality of processing elements.

7. The circuitry for decomposing said input matrix of claim 6 further comprising a preprocessing element for processing an output of the result control circuitry and generating an output coupled to the input of the first and second plurality of processing elements.

8. The circuitry for decomposing said input matrix of claim 7, wherein the preprocessing element comprises a selection circuitry for selectively outputting an input of the preprocessing element either directly or through one of a plurality of operation blocks.

9. The circuitry for decomposing said input matrix of claim 8, wherein the plurality of operation blocks comprises an inverse square root circuitry and a multiplier circuitry.

10. The circuitry for decomposing said input matrix of claim 1, wherein one of the plurality of processing elements of the first type comprises an inverse square root circuitry operable to compute an inverse square root of an element of the input matrix, and multiplier circuitry operable to multiply said inverse square root by another element of the input matrix.

11. The circuitry for decomposing said input matrix of claim 1, wherein one of the plurality of processing elements of the first type comprises an inverse square root circuitry operable to compute an inverse square root of an element output by at least one of the plurality of processing elements of the second type, and multiplier circuitry operable to multiply said inverse square root by another element output by at least one of the plurality of processing elements of the second type.

12. A method of configuring a programmable integrated circuit device for triangulating an input matrix to create a resultant matrix, said method comprising:
configuring logic of said programmable integrated circuit device as a plurality of processing elements of a first type for outputting respective elements of the resultant matrix; and
configuring logic of said programmable integrated circuit device as a plurality of processing elements of a second type, coupled to outputs of the plurality of processing elements of the first type, for outputting respective product elements of said resultant matrix corresponding to respective elements of said input matrix, whereby:
each processing element of the plurality of processing elements of the second type comprises a first and second computation path,
the first computation path being operable to add or subtract a product of respective elements of the resultant matrix from a respective element of the input matrix to output a respective product difference element, and
the second computation path being operable to combine respective elements of the resultant matrix to output a respective inner product element, wherein the respective inner product element is a single number.

13. The method of claim 12 further comprising configuring logic of said programmable integrated circuit device to selectively activate one of the first and second computation path of one of the processing elements of the second type during a particular clock cycle.

14. The method of claim 12, wherein configuring logic of said programmable integrated circuit device as a plurality of processing elements of the first type comprises configuring logic of said programmable integrated circuit device as inverse square root circuitry operable to compute an inverse square root of an element of the input matrix, and configuring logic of said programmable integrated circuit device as multiplier circuitry operable to multiply said inverse square root by another element of the input matrix.

15. The method of claim 12, wherein configuring logic of said programmable integrated circuit device as a plurality of processing elements of the first type comprises configuring logic of said programmable integrated circuit device as inverse square root circuitry operable to compute an inverse square root of an element output by at least one of the plurality of processing elements of the second type, and configuring logic of said programmable integrated circuit device as multiplier circuitry operable to multiply said inverse square root by another element output by at least one of the plurality of processing elements of the second type.

16. A method for decomposing an input matrix, the method comprising:
outputting, with a plurality of processing elements of a first type, respective elements of a triangulated resultant matrix; and outputting, with a plurality of processing elements of a second type, respective inner product elements corresponding to respective elements of said resultant matrix, wherein the processing elements of the second type are respectively coupled to outputs of the plurality of processing elements of the first type, wherein each of the respective inner product elements is a single number.

17. The method of claim 16, wherein each processing element of the plurality of processing elements of the second type comprises a first computation path and a second computation path, wherein the method further comprises:
performing, with the first computation path, one of adding and subtracting a product of respective elements of the resultant matrix from a respective element of the input matrix to output a respective product difference element, and
combining, with the second computation path, respective elements of the resultant matrix to output a respective inner product element.

18. The method of claim 17, further comprising selectively activating, during a particular clock cycle, each one of the first and second computation paths of each one of the processing elements of the second type.

19. The method of claim 17, comprising:
combining two elements of the resultant matrix using a first norm computation element;
combining, with a first adder circuit, an output of the first norm computation element with an element of the input matrix; and
selectively output an output of the first adder circuit to a second adder circuit.

20. The method of claim 16, further comprising:
computing an inverse square root of an element of the input matrix, using an inverse square root circuitry of one of the plurality of processing elements of the first type; and
multiplying said inverse square root by another element of the input matrix, using multiplier circuitry of the one of the plurality of processing elements of the first type.

21. The method of claim 16, further comprising:
computing an inverse square root of an element output by at least one of the plurality of processing elements of the second type, using an inverse square root circuitry of one of the plurality of processing elements of the first type; and
multiplying said inverse square root by another element output by at least one of the plurality of processing elements of the second type, using multiplier circuitry of the one of the plurality of processing elements of the first type.

* * * * *